United States Patent
Bull et al.

(10) Patent No.: US 10,137,876 B2
(45) Date of Patent: Nov. 27, 2018

(54) BRAKING CONTROL DEVICE FOR VEHICLE

(71) Applicant: ADVICS CO., LTD., Kariya-shi, Aichi-ken (JP)

(72) Inventors: Marshall Bull, Wixom, MI (US); Shun Tsukamoto, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 40 days.

(21) Appl. No.: 15/281,820

(22) Filed: Sep. 30, 2016

(65) Prior Publication Data

US 2018/0093653 A1    Apr. 5, 2018

(51) Int. Cl.
| | |
|---|---|
| *B60T 11/18* | (2006.01) |
| *B60T 13/74* | (2006.01) |
| *B60T 7/04* | (2006.01) |
| *B60T 8/40* | (2006.01) |
| *B60T 1/10* | (2006.01) |

(52) U.S. Cl.
CPC ............ *B60T 11/18* (2013.01); *B60T 1/10* (2013.01); *B60T 7/042* (2013.01); *B60T 8/4077* (2013.01); *B60T 13/745* (2013.01)

(58) Field of Classification Search
CPC .......... B60T 7/042; B60T 7/06; B60T 8/4077; B60T 8/00; B60T 13/66; B60T 13/586; B60T 13/662; B60T 13/745; B60T 13/575; B60T 13/743; B60T 13/746; B60T 1/10; B60T 2270/602; B60T 7/065; B60L 7/26; F16H 19/04
USPC ............... 303/152; 188/173; 192/90, 111.12; 477/4, 29
See application file for complete search history.

(56) References Cited

U.S. PATENT DOCUMENTS

| | | | | |
|---|---|---|---|---|
| 4,546,297 A | * | 10/1985 | Washbourn | ........... B60T 8/1893 188/162 |
| 4,546,298 A | * | 10/1985 | Wickham | .............. B60T 8/1893 188/162 |
| 4,651,852 A | * | 3/1987 | Wickham | .............. B60T 8/1893 188/173 |

(Continued)

OTHER PUBLICATIONS

Japanese International Search Report for PCT/JP2017/034188 dated Dec. 19, 2017 with English translation.

*Primary Examiner* — Robert A. Siconolfi
*Assistant Examiner* — San M Aung
(74) *Attorney, Agent, or Firm* — Buchanan Ingersoll & Rooney PC (57) ABSTRACT

A braking control device controllable in cooperation with a regenerative brake includes a case member fixed to the master cylinder, a first electric motor fixed to the case member, a second electric motor fixed to the case member independently of the first electric motor, a linearly movable input rod mechanically connected to the braking operation member, an output rod which presses pistons in the master cylinder and which is linearly movable in parallel with a central axis of the input rod, a differential mechanism which receives output from the first and second electric motors, is allowed to relatively move between the input rod and the output rod, and is built in the case member, and a controller which controls the output from the first electric motor and the output from the second electric motor to independently control force acting on the input rod and displacement of the output rod.

4 Claims, 5 Drawing Sheets

(56) References Cited

U.S. PATENT DOCUMENTS

| | | | |
|---|---|---|---|
| 9,061,673 B2 | 6/2015 | Weiberle et al. | |
| 2002/0056601 A1* | 5/2002 | Inoue | B60W 30/18 |
| | | | 192/3.62 |
| 2010/0275593 A1* | 11/2010 | Okada | B60T 13/162 |
| | | | 60/545 |
| 2011/0139555 A1* | 6/2011 | Hori | B60T 13/741 |
| | | | 188/72.1 |
| 2016/0339890 A1* | 11/2016 | Cann | B60T 13/745 |

* cited by examiner

BRAKING CONTROL DEVICE FOR VEHICLE

BACKGROUND OF THE INVENTION

(1) Field of the Invention

The present invention relates to a braking control device for vehicle.

(2) Description of Related Art

U.S. Pat. No. 9,061,673 describes "a brake system for vehicle which includes: a brake operation member (10); a first piston-cylinder unit (12) in which a first piston (14) of the first piston-cylinder unit (12) can be displaced by the brake operation member (10) operated by at least a regulated minimum manipulated variable, and, therefore, the brake operation member (10) is disposed such that a first inner pressure of the piston-cylinder unit (12) can be increased; at least one wheel brake cylinder hydraulically connected to the first piston-cylinder unit (12) such that a brake pressure of at least one wheel brake cylinder by the first inner pressure can be increased in the first piston-cylinder unit (12); and a first brake booster (24), including a second piston-cylinder unit (26) in which a second piston (28) of the second piston-cylinder unit (26) can be displaced by a first brake booster (24), and, therefore, the first brake booster (24) is disposed in the second piston-cylinder unit (26) such that a second inner pressure in the second piston-cylinder unit (26) can be increased, and to which at least one wheel brake cylinder is hydraulically connected such that a brake pressure of at least one wheel brake cylinder can be increased by the second inner pressure increased in the second piston-cylinder unit (26)".

U.S. Pat. No. 9,061,673 describes a braking control device configured by two piston-cylinder units driven by two electric motors to perform braking in cooperation with a regenerative brake. The device is difficult to be reduced in size as a whole because the device includes the two piston-cylinder units. Thus, the braking control device is desired to be able to be reduced in size.

SUMMARY OF THE INVENTION

It is an object of the present invention to provide a braking control device which can be controlled in cooperation with a regenerative brake, has a simple configuration, and can be easily reduced in size.

A braking control device for vehicle according to the present invention moves a brake fluid from a master cylinder (MC) to a wheel cylinder (WC) depending on an operation of a braking operation member for vehicle (BP) to generate braking force on a wheel (WH). The braking control device for vehicle includes a case member (CAS) fixed to the master cylinder (MC), a first electric motor (MTF) fixed to the case member (CAS), a second electric motor (MTS) fixed to the case member (CAS) independently of the first electric motor (MTF), an input rod (RDI) mechanically connected to the braking operation member (BP) and linearly moving, an output rod (RDO) which presses pistons (PSN, PSM) in the master cylinder (MC) and can linearly move in parallel with a central axis line (Jin) of the input rod (RDI), a differential mechanism (DFR) which receives an output from the first electric motor (MTF) and an output from the second electric motor (MTS), is allowed to relatively move between the input rod (RDI) and the output rod (RDO), and is built in the case member (CAS), and a controller (ECU) which controls the output from the first electric motor (MTF) and the output from the second electric motor (MTS) to independently control force (Fbp) acting on the input rod (RDI) and displacement (Sps) of the output rod (RDO).

According to the configuration, the differential mechanism DFR is employed, and the first and second electric motors MTF and MTS are independently controlled to independently control the force Fbp acting on the input rod RDI and the displacement Sps of the output rod RDO without the force Fbp and the displacement Sps mutually depending on each other. Furthermore, the central axis line Jin of the input rod RDI and a central axis line Jot of the output rod RDO are parallel with each other and different from each other. Since a relationship between the force and the displacement is independently controlled, regenerative cooperation control can be performed. In addition, the braking control device can be configured by one master cylinder MC without employing two master cylinders. Furthermore, an axial dimension is shortened by a separate-axis configuration including the input rod RDI and the output rod RDO to simplify the structure. As a result, the entire device can be reduced in size.

In the braking control device for vehicle according to the present invention, an electric generator (MTD) generating regenerative braking force (Rga) on the wheel (WH) is disposed, and, when the electric generator (MTD) generates the regenerative braking force (Rga) (Rga>0), the controller (ECU) increases the force (Fbp) acting on the input rod (RDI) with an increase in displacement (Sbp) of the input rod (RDI) and controls an output from the first electric motor (MTF) and an output from the second electric motor (MTS) to keep the displacement (Sps) of the output rod (RDO) at zero.

According to the configuration, regenerateable electric power is maximized, and an operation characteristic (relationship of the operation force Fbp to operation displacement Sbp) of the braking operation member BP can be appropriately maintained.

A braking control device for vehicle according to the present invention moves a brake fluid from a master cylinder (MC) to a wheel cylinder (WC) depending on an operation of the braking operation member for vehicle (BP) to generate braking force on the wheel (WH). A braking control device for vehicle includes a first electric motor (MTF) having a first pinion gear (PNF) on an output shaft, a second electric motor (MTS) being different from the first electric motor (MTF) and having a second pinion gear (PNS) on an output shaft, an input rod (RDI) mechanically connected to the braking operation member (BP), a first rack (RKF) fixed to the input rod (RDI) and having a first input rack gear (Gfa) meshed with the first pinion gear (PNF), an output pinion gear (PNO) meshed with a first output rack gear (Gfb) different from the first input rack gear (Gfa) on the first rack (RKF), an output rod (RDO) to which the output pinion gear (PNO) is rotatably fixed, moving in a direction parallel with a central axis line (Jin) of the input rod (RDI), and pressing pistons (PSN, PSM) in the master cylinder (MC), and a second rack (RKS) on which a second input rack gear unit (Gsa) meshed with the second pinion gear (PNS) and a second output rack gear unit (Gsb) meshed with the output pinion gear (PNO) are formed and which can move in a direction parallel with the central axis line (Jin) of the input rod (RDI).

As in the above description, a braking control device which can perform regenerative cooperation control in one master cylinder MC can be configured. In addition, with the input/output separate-axis configuration, an axial dimension is shortened, and an entire device can be reduced in size.

DETAILED DESCRIPTION OF PREFERRED EMBODIMENTS

An embodiment of a braking control device for vehicle according to the present invention will be described below with respect to the accompanying drawings. In the following explanation, like an "ECU" or the like, constituent members, arithmetic processing, signals, characteristics, and values to which the same reference symbols are assigned have the same functions, respectively. A subscript ("fr" or the like) added to the end of each reference symbol is a generic symbol representing a specific wheel to which the reference symbol is related. More specifically, "fr" denotes a front right wheel, "fl" denotes a front left wheel, "rr" denotes a rear right wheel, and "rl" denotes a rear left wheel. For example, as wheel cylinders, a front right wheel cylinder WCfr, a front left wheel cylinder WCfl, a rear right wheel cylinder WCrr, and a rear left wheel cylinder WCrl are described.

<Embodiment of Braking Control Device According to the Present Invention>

Figure 1:
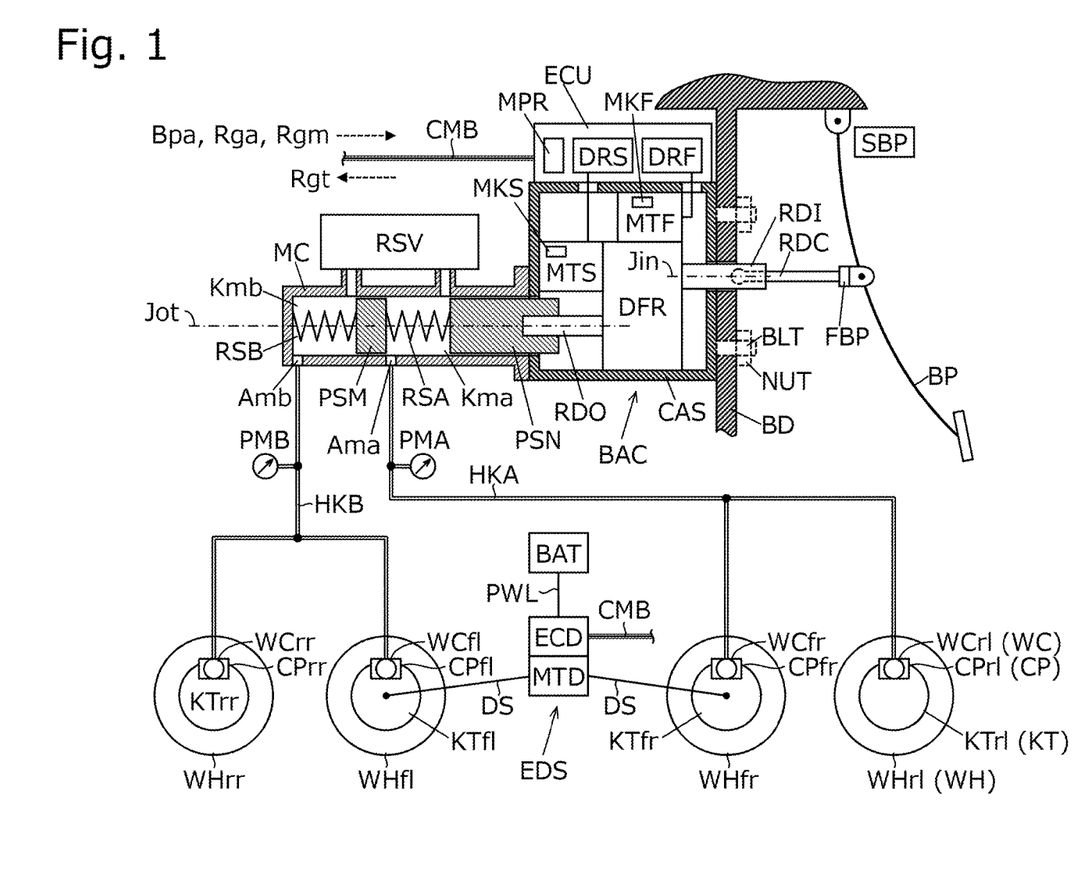
FIG. 1 is an overall block diagram showing an embodiment of a braking control device for vehicle according to the present invention.

A vehicle including an embodiment of a braking control device for vehicle according to the present invention will be described below with respect to the entire block diagram in FIG. 1. The vehicle includes an electric drive device EDS, a braking operation member BP, a manipulated variable sensor BPA, a brake actuator (also simply called an actuator) BAC, an electronic control unit (also called a controller) ECU, a tandem master cylinder (also simply called a master cylinder) MC, and fluid paths (brake pipes) HKA and HKB (also described as "HK").

The wheels WHfr, WHfl, WHrr, and WHrl (also simply described as "WH") of the vehicle include brake calipers CPfr, CPfl, CPrr, and CPrl (also simply called calipers and also described as "CP"), wheel cylinders WCfr, WCfl, WCrr, and WCrl (also simply described as "WC"), and rotating members KTfr, KTfl, KTrr, and KTrl (also simply described as "KT"), respectively. The master cylinder MC, fluid paths HK (generically called HKA and HKB), and the wheel cylinders WC are kept liquid-tight.

<<Electric Drive Device EDS>>

Furthermore, the vehicle includes an electric drive device EDS. More specifically, the vehicle is an electric automobile or a hybrid vehicle. The electric drive device EDS includes a drive electric motor MTD and a driving electronic control unit ECD. For example, the drive motor MTD is disposed on the front wheel WHfr and WHfl of the vehicle through a drive shaft DS.

The drive electric motor MTD functions as an electric motor when the vehicle is accelerated to cause the front wheels WHfr and WHfl to generate driving force. On the other hand, when the vehicle is decelerated, the drive electric motor MTD functions as an electric generator to cause the front wheels WHfr and WHfl to generate regenerative braking force. At this time, kinetic energy of the vehicle is converted into electric power by the electric generator MTD, and the electric power is accumulated in a secondary battery BAT mounted on the vehicle. The drive electric motor (i.e., electric generator) MTD functions as not only a so-called driving force generating device but also a regenerative braking device.

The driving electronic control unit ECD controls the drive electric motor MTD. More specifically, the driving electronic control unit ECD adjusts an output torque from the drive electric motor MTD depending on a manipulated variable of an accelerator operation member (for example, an accelerator pedal) (not shown). In a braking state, the driving electronic control unit ECD controls regenerative braking force Rga on the basis of a manipulated variable Bpa of the braking operation member BP. For example, the electronic control unit ECD monitors a charging state of the battery BAT and calculates a maximum possible regenerative braking force Rgm on the basis of the charging state. The maximum regenerative braking force Rgm is transmitted from the electronic control unit ECD to the electronic control unit ECU through a communication path CMB. The braking electronic control unit ECU determines target values of frictional braking force and regenerative braking force. A target value Rgt of the regenerative braking force is transmitted from the braking electronic control unit ECU to the driving electronic control unit ECD through the communication path CMB, and the electronic control unit ECD controls an actual value Rga on the basis of the target value Rgt. The electric drive device EDS has been described above.

The braking operation member (for example, a brake pedal) BP is a member operated to decelerate a vehicle with a driver. The braking operation member BP can be rotatably fixed to a vehicle body BD. An operation displacement sensor SBP is disposed on a fixing portion between the braking operation member BP and the vehicle body BD. The operation displacement sensor SBP detects an operation displacement Sbp. The braking operation member BP is operated to adjust braking torques of the wheels WH (i.e., WHfr, WHfl, WHrr, and WHrl) to generate braking force on the wheels WH.

More specifically, rotating members (for example, brake discs) KT are fixed to the wheels WH of the vehicle, respectively. The calipers CP are disposed to clamp the rotating members KT (KTfr, KTfl, KTrr, and KTrl). The wheel cylinders WC (more specifically, WCfr, WCfl, WCrr, and WCrl) are disposed in the calipers CP (more specifically, CPfr, CPfl, CPrr, and CPrl), respectively. Pressures (fluid pressures) of brake fluid in the wheel cylinders WC are increased to press frictional members (for example, brake pads) against the rotating members KT, respectively. Since the rotating members KT and the wheels WH are fixed to each other to be rotated integrally with each other, frictional force generated at this time generate braking torque (braking force) on the wheels WH.

The manipulated variable sensor BPA is disposed on the braking operation member BP. The manipulated variable sensor BPA acquires (detects) a manipulated variable (braking manipulated variable) Bpa of the braking operation member BP operated with a driver. More specifically, as the manipulated variable sensor BPA, at least one of "fluid pressure sensors PMA and PMB detecting pressures Pma and Pmb of the master cylinder MC", "the operation displacement sensor SBP detecting the operation displacement Sbp of the braking operation member BP", and "an operation force sensor FBP detecting the operation force Fpb of the braking operation member BP" is employed. More specifically, the manipulated variable sensor BPA is a generic name given to the master cylinder fluid pressure sensors PMA and PMB, the operation displacement sensor SBP, and the operation force sensor FBP. Thus, the braking manipulated variable Bpa is determined based on at least one of the fluid pressures Pma and Pmb of the master cylinder MC, the operation displacement Sbp of the braking operation member BP, and the operation force Fbp of the braking operation member BP. The manipulated variable Bpa is input to the electronic control unit (controller) ECU.

<<Brake Actuator BAC>>

A brake actuator BAC independently controls a relationship between the operation force Fbp (i.e., force acting on an input rod RDI) acting on the braking operation member BP and piston displacement (i.e., the displacement Sps of the output rod RDO) of the master cylinder MC. The actuator BAC includes a case member CAS, a first electric motor MTF, a second electric motor MTS, the input rod RDI, the output rod RDO, and a differential mechanism DFR.

The case member CAS is a box-like member having a space formed therein. In the case member CAS, members such as the differential mechanism DFR constituting the actuator BAC are built. The case member CAS is fixed to the vehicle body BD of the vehicle with mounting bolts BLT and nuts NUT. On the other side of the fixing portion of the vehicle body BD, the master cylinder MC and the case member CAS are fixed. More specifically, the case member CAS is fixed to the master cylinder MC.

In the case member CAS, the first electric motor MTF and the second electric motor MTS are fixed. The first electric motor MTF and the second electric motor MTS are different electric motors. Thus, the two electric motors MTF and MTS are built in the case member CAS. An output (output shaft portion Shf) of the first electric motor MTF and an output (output shaft portion Shs) of the second electric motor MTS are input to the differential mechanism DFR.

The input rod RDI is mechanically connected to the braking operation member BP. More specifically, a connecting rod RDC is mechanically connected to the braking operation member BP. The connecting rod RDC and the input rod RDI are mechanically connected to each other. The braking operation member BP performs circular motion around the fixing portion to the vehicle body BD. The connecting rod RDC allows the circular motion of the braking operation member BP. The circular motion of the braking operation member BP is converted into linear motion of the input rod RDI by the connecting rod RDC. The operation force sensor FBP is disposed on an attaching portion (connection portion) between the connecting rod RDC and the braking operation member BP. The operation force sensor FBP detects the operation force Fbp. The input rod RDI is incorporated in the case member CAS such that the input rod RDI can linearly move in a direction along a central axis line Jin of the input rod RDI. At a portion on an opposite side of the attaching portion between the input rod RDI and the braking operation member BP, the input rod RDI is input to the differential mechanism DFR.

Like the input rod RDI, the output rod RDO is incorporated in the case member CAS such that the output rod RDO can linearly move in parallel with the central axis line Jin of the input rod RDI. The output rod RDO is an output member of the actuator BAC, and an end of the output rod RDO presses a piston PSN in the master cylinder MC.

In geometric relation, the central axis line Jin of the input rod RDI and a central axis line Jot of the output rod RDO are parallel with each other and separated from each other at a distance larger than "0 (zero)". More specifically, the axis line Jin and the axis line Jot are different axis lines and are not coaxial. The output rod RDO, a circular cylindrical inner wall of the master cylinder MC, a first piston PSN, and a second piston PSM are disposed along a coaxis line. Thus, the central axis line of these members is the axis Jot.

The input rod RDI and the output rod RDO are built in the case member CAS such that the input rod RDI and the output rod RDO can mutually move along different axes. In the differential mechanism DFR, an output from the first electric motor MTF and an output from the second electric motor MTS are controlled to make it possible to independently control the force (i.e., operation force of the braking operation member BP) Fbp acting on the input rod RDI and the displacement (i.e., displacement of the piston PSN) Sps of the output rod RDO. In this case, outputs from the first and second electric motors MTF and MTS are rotating directions and torques, respectively.

The differential mechanism DFR is built in the case member CAS. The differential mechanism DFR allows the input rod RDI and the output rod RDO to relatively move. The outputs from the first and second electric motors MTF and MTS are input to the differential mechanism DFR. Thus, the differential mechanism DFR is a power transmission mechanism having two inputs (three inputs when the input rod RDI and the first electric motor MTF are considered as different inputs) and one output. The differential mechanism DFR will be described later in detail.

The electronic control unit (controller) ECU controls the first and second electric motors MTF and MTS (also simply described as "MT") based on the manipulated variable Bpa (generic name of the operation displacement Sbp or the like). More specifically, in a microprocessor MPR of the controller ECU, a control algorithm to control the two electric motors MT is programmed to calculate a signal to control the electric motors MT. In the controller ECU, a first drive circuit DRF driving the first electric motor MTF and a second drive circuit DRS driving the second electric motor MTS are disposed. The first and second drive circuits DRF and DRS (also simply described as "DR") are electric circuits including a plurality of switching elements, and are controlled by the microprocessor MPR.

The controller ECU controls the electric motors MT to control independently a relationship between the force Fbp acting on the input rod RDI and the displacement Sps of the output rod RDO (as a result, a piston displacement in the master cylinder). More specifically, an operation characteristic (relationship between the operation displacement Sbp and the operation force Fbp) of the braking operation member BP and frictional braking force can be arbitrarily set. For example, the controller ECU, when the drive electric motor MTD generates the regenerative braking force Rga (i.e., the drive electric motor MTD functions as an electric generator), increases the force Fbp acting on the input rod RDI according to an increase (i.e., increment of the manipulated variable Bpa) of the displacement Sbp of the input rod RDI, and controls an output from the first electric motor MTF and an output from the second electric motor MTS such that the displacement Sps of the output rod RDO is kept zero. In this manner, electric power regenerated by the drive electric motor MTD is sufficiently secured, and the operation characteristic of the braking operation member BP can be made adequate. The actuator BAC has been described above.

The master cylinder MC is mechanically connected to the output rod RDO. Two first and second fluid paths (brake pipes) HKA and HKB (also simply described as "HK") are fluidically connected to the master cylinder MC. When the braking operation member BP is operated, brake fluid is discharged (pressure-fed) from the master cylinder MC into the fluid paths HK so as to pressurize the brake fluid in the four wheel cylinders WC. The brake fluid is fully filled in interiors of constituent members extending from the master cylinder MC to the wheel cylinders WC to set the interiors in a liquid-tight state.

In the master cylinder MC, the inner walls and the two pistons PSN and PSM form two first and second fluid pressure chambers Kma and Kmb. The master cylinder MC is a so-called tandem master cylinder. In the configuration of a diagonal fluid path, the first fluid pressure chamber Kma of the master cylinder MC is fluidically connected to the wheel cylinders WCfr and WCrl through the first fluid path HKA. The second fluid pressure chamber Kmb of the master cylinder MC is fluidically connected to the wheel cylinders WCfl and WCrr through the second fluid path HKB. A configuration related to the first fluid pressure chamber Kma and a configuration related to the second fluid pressure chamber Kmb are basically the same as each other.

The first and second pistons PSN and PSM are pressed against the output rod RDO by two elastic members (for example, compression springs) RSA and RSB. More specifically, the second elastic member RSB is compressed and disposed between an inner cylinder bottom of the master cylinder MC and the second piston PSM, and the first elastic member RSA is compressed and disposed between the second piston PSM and the first piston PSN. Thus, the output rod RDO can be separated from the first piston PSN. However, since the first and second elastic members RSA and RSB press the pistons against the output rod RDO, the pistons are moved integrally with the output rod RDO in a braking state.

When the braking operation member BP is operated, the output rod RDO is moved forward, and the first and second pistons PSN and PSM are pressed by the output rod RDO. In the motion of the first and second pistons PSN and PSM, the "forward direction (left in the drawing)" is a direction in which the volumes of the first and second fluid pressure chambers Kma and Kmb decrease, and brake fluid is pressure-fed from the master cylinder MC. Thus, the forward movement of the first and second pistons PSN and PSM allows the fluid pressures (i.e., braking torques of the wheels WH) in the wheel cylinders to increase. The "backward direction (right in the drawing)" of the first and second pistons PSN and PSM is a direction in which the volumes of the first and second fluid pressure chambers Kma and Kmb increase, and the master cylinder MC absorbs the brake fluid. Thus, the backward motion of the first and second pistons PSN and PSM allows the wheel cylinder fluid pressures (i.e., braking torques of the wheels WH) to decrease.

When the first and second pistons PSN and PSM are moved forward, the pistons PSN and PSM block the fluid path to a reserver RSV. Furthermore, when the first and second pistons PSN and PSM are moved forward, the volumes of the first and second fluid pressure chambers Kma and Kmb are decreased, and fluid pressures in the four wheel cylinders WC are increased.

When a driver returns the braking operation member BP toward an initial position (position corresponding to a non-braking state) to move the output rod RDO backward, the first and second pistons PSN and PSM are pressed backward by the first and second elastic members RSA and RSB. Thus, the first and second pistons PSN and PSM move backward, and the volumes of the first and second fluid pressure chambers Kma and Kmb are increased. As a result, the brake fluid returns to the master cylinder MC to reduce the fluid pressures in the four wheel cylinders WC.

The first and second fluid pressure sensors PMA and PMB are disposed to detect the fluid pressures (i.e., the fluid pressures in the wheel cylinders WC) Pma and Pmb of the first and second fluid pressure chambers Kma and Kmb. The fluid pressure sensors PMA and PMB correspond to the braking manipulated variable sensor BPA, and the first and second fluid pressures Pma and Pmb correspond to the manipulated variable Bpa. The first and second fluid pressures Pma and Pmb are input to the electronic control unit ECU.

Brake calipers (also simply called calipers) CP are disposed on the wheels WH, and braking torques are given to the wheels WH to generate braking force. As the calipers CP, disc braking devices (disc brakes) can be employed. Each of the calipers CP is configured to clamp the brake disc KT through two brake pads. The wheel cylinder WC is disposed in the caliper CP. The fluid pressure in the wheel cylinder WC is adjusted to move a brake piston in the wheel cylinder WC with respect to the rotating member KT. The motion of the brake piston causes the frictional member to be pressed against the rotating member KT to generate frictional force.

<First Configuration of Differential Mechanism DFR>

Figure 2:
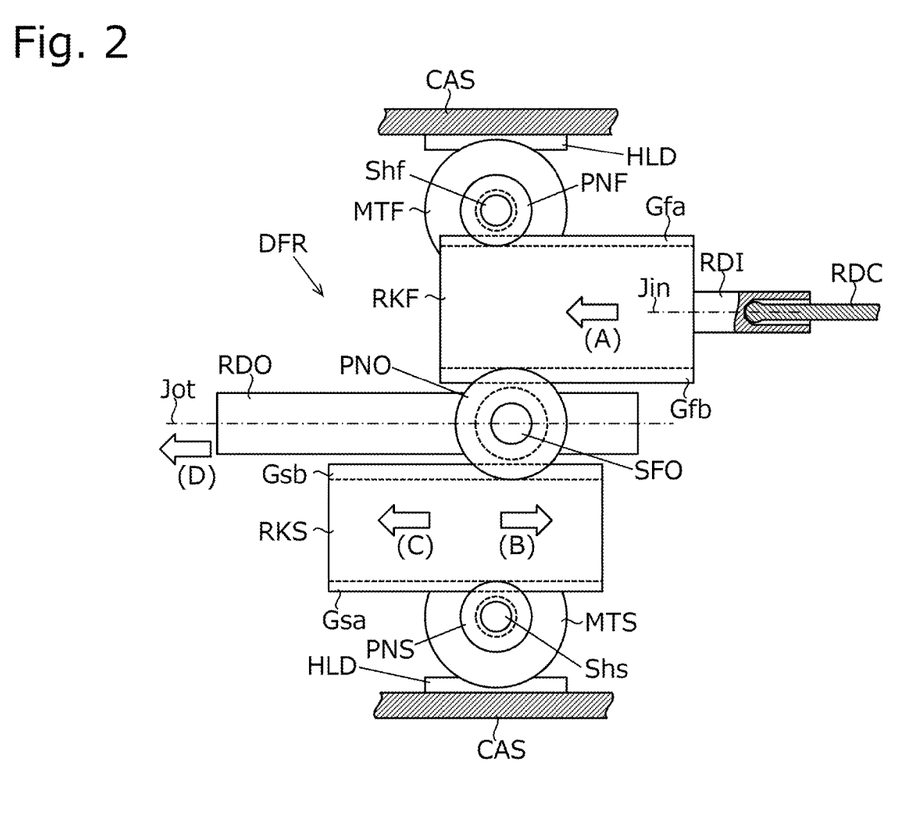
FIG. 2 is a schematic diagram for explaining a first configuration of a differential mechanism.

A first configuration of the differential mechanism DFR will be described below with reference to the schematic view in FIG. 2. In the first configuration, the differential mechanism DFR is formed of a rack-and-pinion mechanism. The rack-and-pinion mechanism mentioned here is a conversion mechanism between rotational motion and linear motion. More specifically, the mechanism is obtained by combining a "circular gear called a pinion gear" and a "rack on which teeth (rack gear) to be meshed with the pinion gear are formed on a planar rod" to each other.

In the case member CAS, the first and second electric motors MTF and MTS are fixed by a fixing member HLD. A first pinion gear PNF is fixed to the output shaft unit Shf of the first electric motor MTF. Similarly, a second pinion gear PNS is fixed to the output shaft unit Shf of the second electric motor MTS.

The connecting rod RDC is rotatably connected to the braking operation member BP via a clevis (U-shaped link). The connecting rod RDC is worked into a spherical shape in the opposite side of the clevis and mechanically connected to the input rod RDI. More specifically, the input rod RDI and the braking operation member BP are mechanically connected via the connecting rod RDC. While the braking operation member BP performs circular motion around the fixing portion to the vehicle body BD, the circular motion of the braking operation member BP is effectively converted into linear motion of the input rod RDI by the connecting rod RDC.

A distal end (opposite side of the end connected to the braking operation member BP) of the input rod RDI is fixed to a first rack RKF. The first rack RKF is incorporated in the case member CAS such that the first rack RKF can smoothly move in a direction along the central axis line Jin. Two rack gears Gfa and Gfb are formed on the first rack RKF. The first input rack gear Gfa is meshed with the first pinion gear PNF.

In the first rack RKF, the first output rack gear Gfb is formed on the bottom side of the first input rack gear Gfa. The first output rack gear Gfb is meshed with an output pinion gear PNO.

The output pinion gear PNO is rotatably fixed to the output rod RDO by a rotating shaft SFO. The output rod RDO is incorporated in the case member CAS such that the output rod RDO can smoothly move in a direction along the central axis line Jot. The central axis line Jin and the central axis line Jot are different parallel axes. More specifically, an inter-axis distance between the axis line Jin and the axis line Jot is not "0 (zero)". The configuration is called a "separate-axis configuration".

The output pinion gear PNO is meshed with a second output rack gear Gsb of a second rack RKS. Like the first rack RKF, two rack gears Gsa and Gsb are formed on the second rack RKS. More specifically, on the second rack RKS, the second input rack gear Gsa is formed on the bottom side of the second output rack gear Gsb. The second input rack gear Gsa is meshed with the second pinion gear PNS. Like the first rack RKF and the output rod RDO, the second rack RKS is incorporated in the case member CAS such that the second rack RKS can smoothly move in a direction along the central axis line Jin (central axis line Jot). More specifically, in the differential mechanism DFR, the first and second racks RKF and RKS and the output rod RDO can relatively linearly move in parallel with each other (in other words, relative movement is allowed).

Of forward and reverse rotation directions (i.e., rotation directions) of the first and second electric motors MTF and MTS, the forward rotation direction corresponds to a forward direction of the output rod RDO (i.e., the pistons PSN and PSM). Thus, the forward rotation direction of the first and second electric motors MT corresponds to a direction in which the first and second fluid pressures Pma and Pmb (as a result, braking torques) increase. On the other hand, the reverse rotation direction of the first and second electric motors MTF and MTS corresponds to the backward direction of the output rod RDO. Thus, the reverse direction of the electric motors MTF and MTS corresponds to a direction in which the fluid pressures Pma and Pmb (i.e., braking torques) decrease.

When the braking manipulated variable Bpa is increased, and when the input rod RDI is moved forward, the first electric motor MTF is driven in a forward rotation direction. In this manner, rotating power of the first electric motor MTF is transmitted to the first rack RKF through the first pinion gear PNF to assist the operation of the braking operation member BP by a driver. More specifically, the forward rotation power of the first electric motor MTF reduces the operation force Fbp of the braking operation member BP.

Forward movement of the input rod RDI (see arrow (A)) is transmitted to the output rod RDO through the first rack RKF and the output pinion gear PNO. In this manner, the output rod RDO also tends to move in the forward direction. However, the movement of the output rod RDO depends on motion (displacement) of the second rack RKS driven by the second electric motor MTS.

The drive electric motor (electric generator) MTD generates the regenerative braking force Rga. When the regenerative braking force Rga is sufficient in deceleration of the vehicle, frictional braking force need not be generated. Thus, even though the braking operation member BP moves the input rod RDI forward, the output rod RDO is not moved forward, and a braking fluid pressure is prevented from being generated. More specifically, the second electric motor MTS is driven in the reverse direction, and the second rack RKS is moved backward (see arrow (B)). In this manner, since power transmission from the first rack RKF is canceled, displacement of the output rod RDO is avoided from being generated, and the drive electric motor MTD can regenerate sufficient energy.

When the rotating speeds of the wheels WH decrease to make the regenerative braking force less than the requested deceleration of the vehicle, frictional braking force (i.e., increase in braking fluid pressure) is necessary. In this case, the second electric motor MTS is stopped or driven in a forward rotation direction, and the second rack RKS is stopped or moved forward (see arrow (C)). In this manner, the output rod RDO is moved forward (see arrow (D)), and the regenerative braking force and the frictional braking force can be controlled in cooperation with each other. Furthermore, when the regenerative braking force is not generated, the second electric motor MTS is rotated forward, the output rod RDO is moved forward, and the frictional braking force is increased depending on the braking manipulated variable Bpa.

The differential mechanism DFR is employed to configure an actuator BAC having two inputs (three inputs when the input rod RDI and the first input pinion gear PNF are considered as different inputs) and one output. The first and second electric motors MTF and MTS separate the force and the displacement from each other and independently control the force and the displacement. For this reason, the braking control device which can perform regenerative cooperation control can be configured by one master cylinder MC without employing two master cylinders.

In particular, when a tandem master cylinder is employed as the master cylinder MC, the two fluid pressure chambers Kma and Kmb are disposed in series with each other. For this reason, the master cylinder MC increases in dimension in the central axis direction. However, in the differential mechanism DFR, a separate-axis configuration is employed, the first and second racks RKF and RKS and the output rod RDO relatively linearly move in parallel with each other. For this reason, the dimension in the axial direction is shortened to simplify the structure. As a result, the entire device can be reduced in size.

<Electric Motors MTF and MTS and Drive Circuits DRF and DRS>

Figure 3:
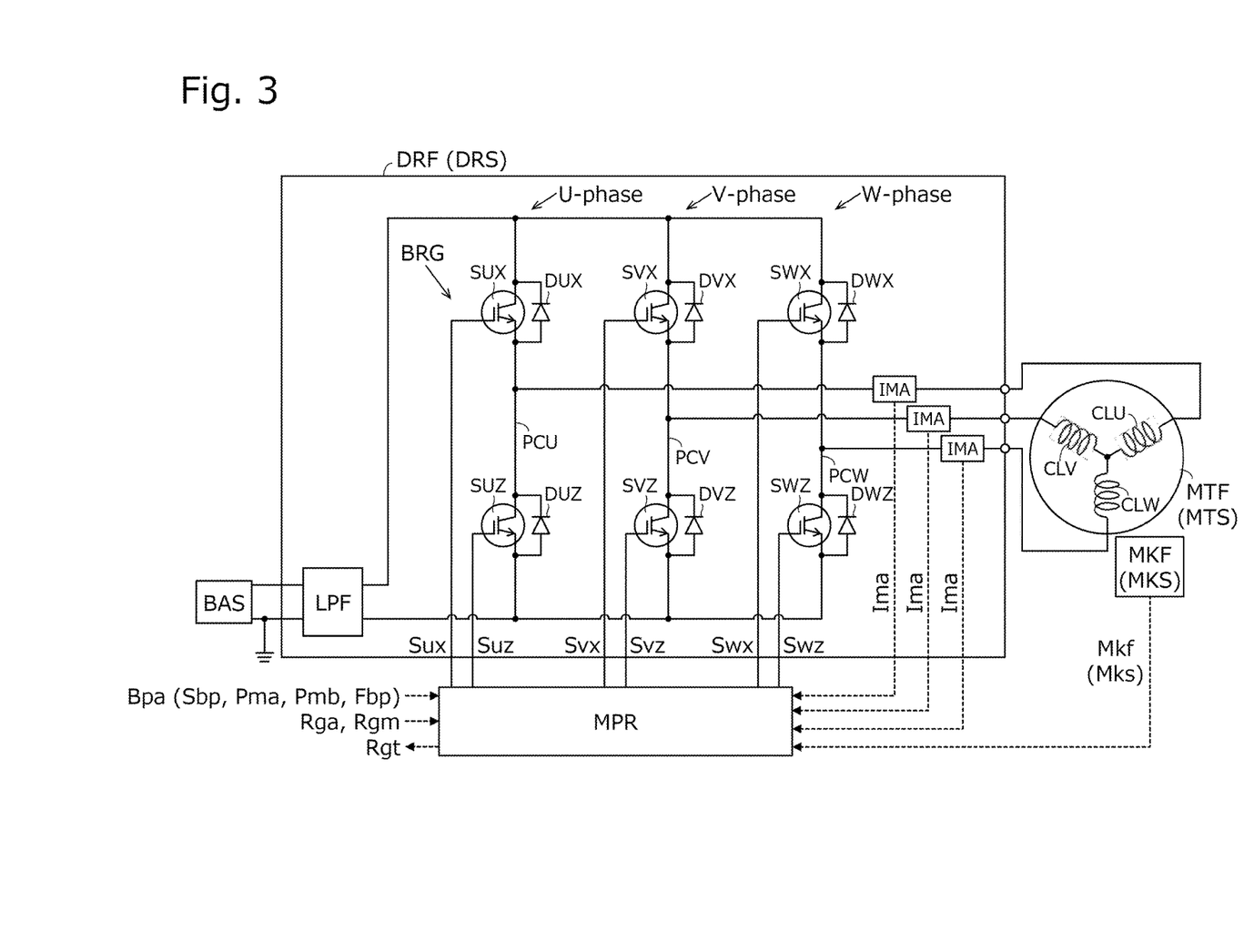
FIG. 3 is a circuit diagram for explaining an electric motor and a drive circuit therefor.

The first and second electric motors MTF and MTS and the first and second drive circuits DRF and DRS will be described below with reference to the circuit diagram in FIG. 3. In this case, since the configuration related to the first electric motor MTF and the configuration related to the second electric motor MTS are the same as each other, the configuration related to the first electric motor MTF will be described, and the configuration related to the second electric motor MTS will not be described in detail. An explanation in which "MTF" is replaced with "MTS", "DRF" is replaced with "DRS", "MKF" is replaced with "MKS", and "Mkf" is replaced with "Mks" corresponds to the configuration related to the second electric motor MTS.

The first drive circuit DRF is an electric circuit which drives the first electric motor MTF and corresponds to a part of the controller ECU. The drive circuit DRF is configured by a 3-phase bridge circuit (also simply called a bridge circuit) BRG and a stabilizing circuit LPF. The bridge circuit BRG is formed of six switching elements (power transistors) SUX, SUZ, SVX, SVZ, SWX, and SWZ (also described as "SUX to SWZ"). Based on drive signals Sux, Suz, Svx, Svz, Swx, and Swz (also described as Sux to Swz) of phases from the microprocessor MPR, the bridge circuit BRG is driven and an output from the electric motors MTF is adjusted. In the electric motors MTF, a rotating angle sensor MKF is disposed to detect a rotating angle Mkf.

In the microprocessor MPR, based on the manipulated variable Bpa (at least one of the operation displacement Sbp, the fluid pressures Pma and Pmb, and the operation force Fbp), the regenerative braking force Rga, and the rotating angle Mkf, a target energization quantity (generic name of each phase) Imt of each phase (U-phase, V-phase, or W-phase) is calculated. Depending on the target energization quantity Imt, a duty ratio (ratio of an ON time to one cycle) of pulse widths of the phases is determined. Based on the duty ratio (target value), the drive signals Sux to Swz representing whether the switching elements SUX to SWZ configuring the bridge circuit BRG are set in an ON state (energization state) or an OFF state (non-energization state) are calculated. More specifically, the drive signals Sux to Swz to perform pulse width modulation for the switching elements SUX to SWZ are calculated. The bridge circuit BRG of the drive circuit DRF is driven by the drive signals Sux to Swz.

The energization states or non-energization states of the six switching elements SUX to SWZ are independently controlled by the six drive signals Sux to Swz, respectively. In this case, when the duty ratio is large, in each of the switching element, an energization time per unit time is elongated, and a larger current is caused to flow in the coil. As a result, rotating power of the electric motors MTF is made high.

The drive circuit DRF includes energization quantity acquiring means (for example, a current sensor) IMA for each phase to detect an actual energization quantity (generic name of each phase) Ima. So-called current feedback is executed such that the detected value (actual current value) Ima of each phase is equal to the target value Imt. More specifically, the duty ratio is corrected (finely adjusted) based on a deviation between the actual energization quantity Ima and the target energization quantity Imt. The current feedback control can achieve accurate motor control.

The drive circuit DRF receives electric power supplied from a power source (battery BAS). In order to reduce a variation in supplied electric power (voltage), the drive circuit DRF includes the stabilizing circuit LPF.

<Drive Processing of Electric Motors MTF and MTS>

Figure 4:
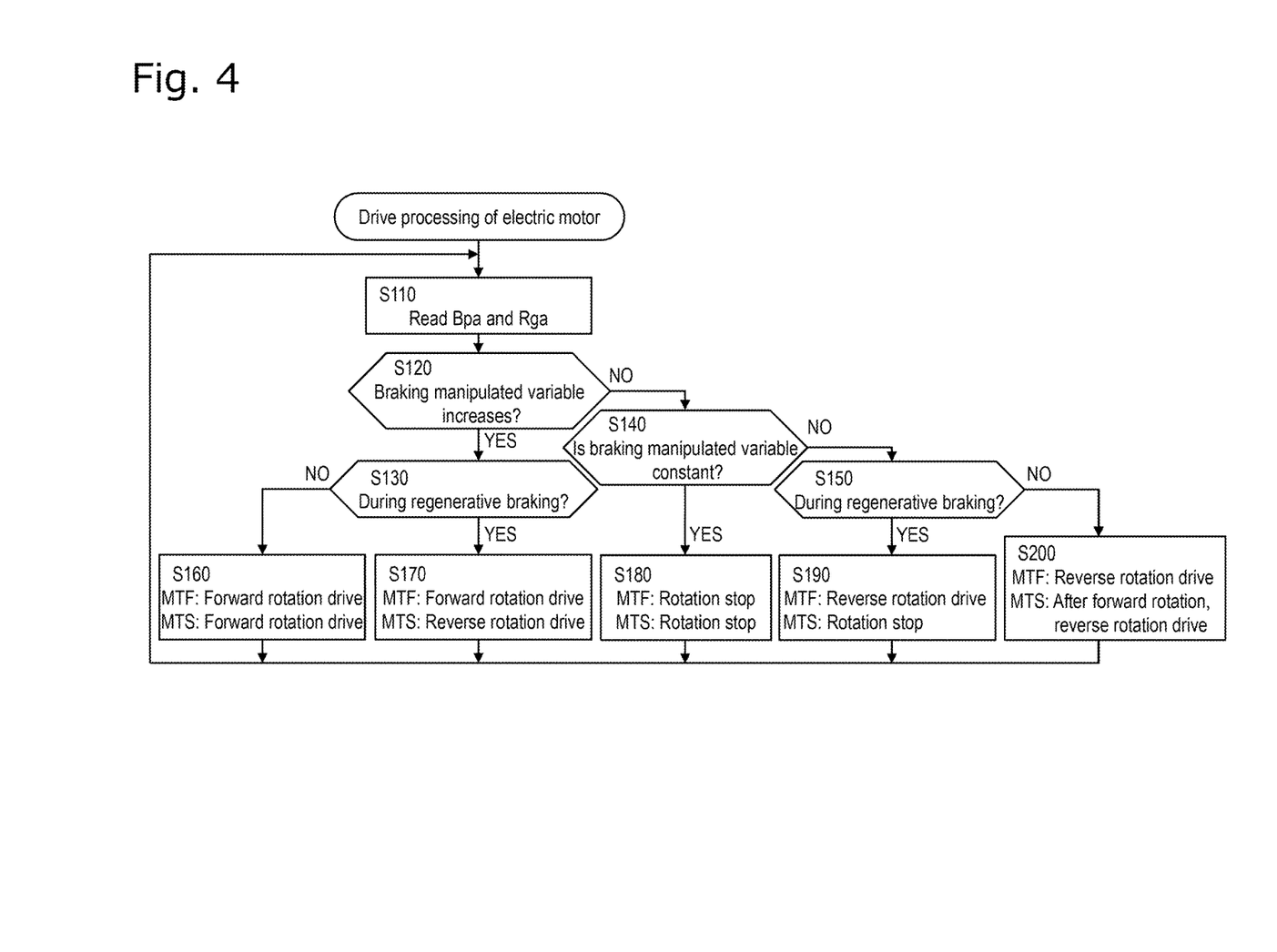
FIG. 4 is a control flow chart for explaining drive processing of the electric motor.

Drive processing of the first and second electric motors MTF and MTS will be described below with reference to the control flow chart in FIG. 4. In the actuator BAC, outputs from the first electric motors MTF and MTS input to the differential mechanism DFR are adjusted to independently control the force Fbp (i.e., the operation force Fbp of the braking operation member BP) acting on the input rod RDI and the displacement Sps (i.e., the operation displacement Sbp of the braking operation member BP) of the output rod RDO.

In step S110, the braking manipulated variable Bpa and the regenerative braking force (actual value) Rga are read. In step S120, it is determined based on the braking manipulated variable Bpa whether "the manipulated variable Bpa increases". When step S120 is positive when the manipulated variable Bpa is increasing (if "YES"), the control flow shifts to step S130. On the other hand, step S120 is negative (if "NO"), the control flow shifts to step S140.

In step S130, based on the regenerative braking force Rga, it is determined whether "regenerative braking is being operated". When step S130 is positive when the regenerative braking is being operated (if "YES"), the control flow shifts to step S170. On the other hand, step S130 is negative (if "NO"), the control flow shifts to step S160.

In step S140, it is determined based on the braking manipulated variable Bpa whether "the manipulated variable Bpa is constant". When the braking operation member BP is held and step S140 is positive (if "YES"), the control flow shifts to step S180. On the other hand, when step S140 is negative when the manipulated variable Bpa is decreasing (if "NO"), the control flow shifts to step S150.

In step S150, based on the regenerative braking force Rga, it is determined whether "regenerative braking is being operated". When step S150 is positive when the regenerative braking is being operated (if "YES"), the control flow shifts to step S190. On the other hand, step S150 is negative (if "NO"), the control flow shifts to step S200.

When the manipulated variable Bpa is increased and the regenerative braking force is not generated, in step S160, both the first electric motor MTF and the second electric motor MTS are driven in the forward rotation direction. Thus, the first electric motor MTF and the second electric motor MTS move the output rod RDO (accordingly, the piston PSN) forward. As a result, frictional braking force is generated.

When the manipulated variable Bpa is increased and the regenerative braking force is generated, in step S170, the first electric motor MTF is driven in the forward rotation direction, and the second electric motor MTS is driven in the reverse rotation direction. Thus, the motion of the first electric motor MTF is suppressed (partially or fully canceled) by the second electric motor MTS, the output rod RDO (accordingly, the pistons PSN and PSM) is slightly moved forward or maintained in a movement stop state (holding state). As a result, the frictional braking force is slightly generated or is not generated.

When the braking operation member BP is kept and the manipulated variable Bpa is kept constant, in step S180, both the first electric motor MTF and the second electric motor MTS are set in a stop state. Thus, the output rod RDO (accordingly, the pistons PSN and PSM) is not moved.

Although the manipulated variable Bpa is reduced, when regenerative braking force is still generated, in step S190, the first electric motor MTF is driven in the reverse rotation direction, and the rotation of the second electric motor MTS is stopped.

When the manipulated variable Bpa is reduced and the regenerative braking force is not generated, in step S200, the first electric motor MTF is driven in the reverse rotation direction. At this time, the second electric motor MTS is driven in the forward rotation direction by the rotation of the second electric motor MTS in the reverse rotation direction in step S170, and, thereafter, is driven in the reverse rotation direction.

In the differential mechanism DFR, outputs from the first electric motor MTF and the second electric motor MTS are adjusted to independently control the input rod RDI and the output rod RDO such that the input rod RDI and the output rod RDO do not mutually depend on each other in terms of a "relationship between force and displacement". As a result, in the braking operation member BP, the characteristic (operation characteristic) of the operation force Fbp with respect to the operation displacement Sbp is always kept to an appropriate characteristic. For this reason, even though three states, i.e., "only regenerative braking force is generated", "regenerative braking force and frictional braking force are generated in cooperation with each other", and "only frictional braking force is generated" change, a smooth operation characteristic can be secured without being sharply changed in each state change.

For example, when the drive electric motor (electric generator) MTD generates the regenerative braking force Rga (Rga>0), a "state in which displacement (i.e., the operation displacement Sbp of the braking operation member BP) of the input rod RDI increases, and force acting on the input rod RDI (i.e., the operation force Fbp of the braking operation member BP) is increased" and a "state in which the displacement Sps (i.e., displacement of the piston PSN) of the output rod RDO is zero (i.e., no frictional braking force is generated)" are achieved. For this reason, in a state in which the operation characteristic (relationship of the operation force Fbp to the operation displacement Sbp) of the braking operation member BP is appropriately maintained, cooperation between the regenerative braking force and the frictional braking force (contributing rates of the regenerative braking force and the frictional braking force in braking force in the entire vehicle) can be arbitrarily adjusted. As a result, since the regenerative braking force is effectively used, kinetic energy in vehicle deceleration can be efficiently collected. More specifically, regenerateable electric power is maximized, and a characteristic (operation characteristic) of the operation force Fbp with respect to the operation displacement Sbp can be preferably maintained.

<Second Configuration of Differential Mechanism DFR>

Figure 5:
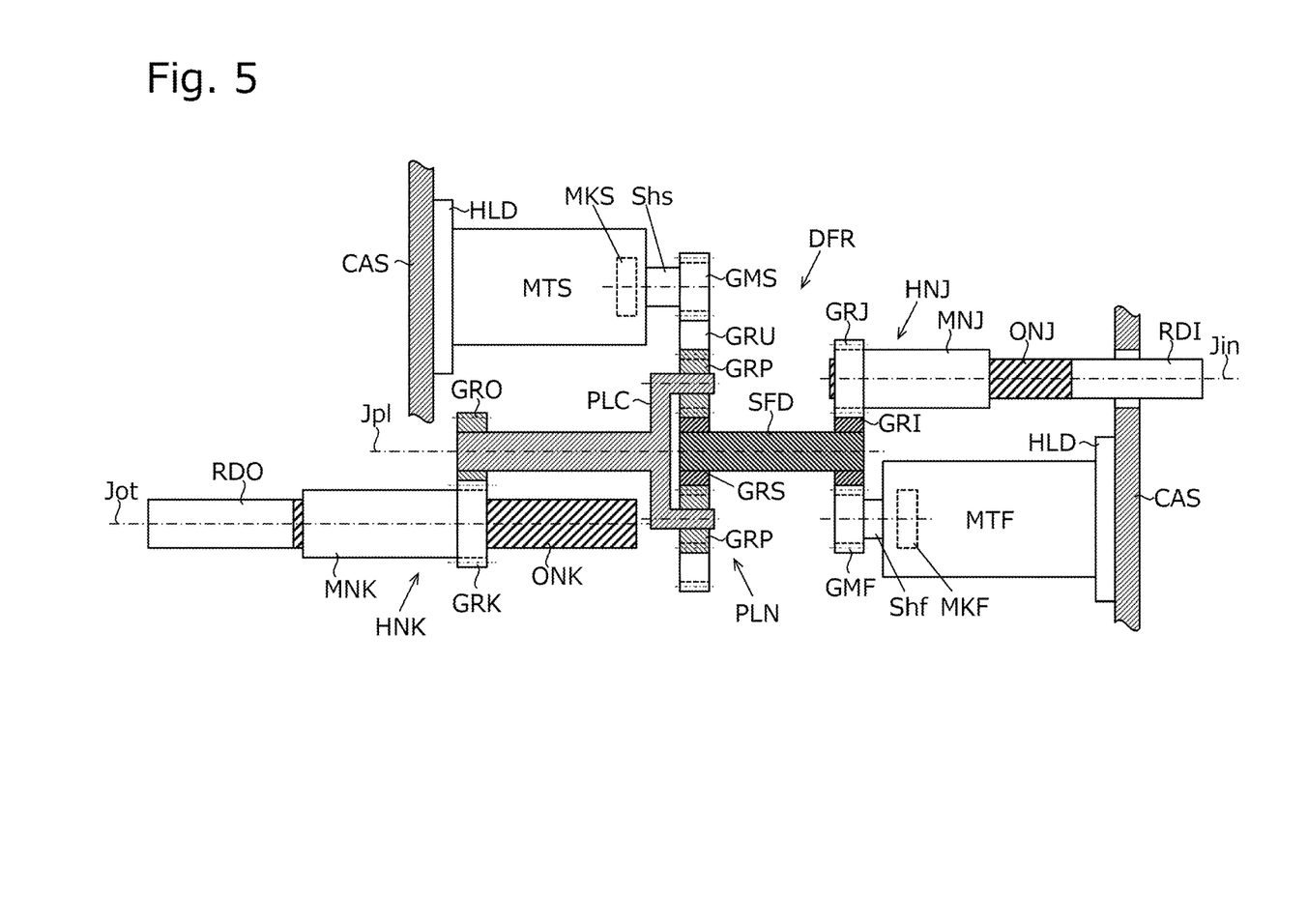
FIG. 5 is a partial sectional view for explaining a second configuration of a differential mechanism.

A second configuration of the differential mechanism DFR will be described below with reference to the schematic view in FIG. 5. In the first configuration, the differential mechanism DFR is formed of a rack-and-pinion mechanism. However, in the second configuration, the differential mechanism DFR is configured by a planet gear mechanism PLN. In other words, as the differential mechanism DFR, in the first configuration, a mechanism performing linear motion (i.e., a rack-and-pinion mechanism) is employed. However, in place of this, in the second configuration, a mechanism performing rotational motion (i.e., a planet gear mechanism) is employed.

In the case member CAS, the first and second electric motors MTF and MTS are fixed by the fixing member HLD. A first motor gear GMF is fixed to the output shaft unit Shf of the first electric motor MTF. Similarly, a second motor gear GMS is fixed to the output shaft unit Shs of the second electric motor MTS.

The linear motion of the input rod RDI is converted into rotational motion of the input rod gear GRJ by an input conversion mechanism HNJ. In this case, the input conversion mechanism HNJ is a power conversion mechanism between rotational motion and linear motion. More specifically, an input male screw ONJ is formed on the input rod RDI, the input male screw ONJ is meshed with an input female screw MNJ. On the outer periphery of the input female screw MNJ, an input rod gear GRJ is fixed. The input rod gear GRJ and a transmission shaft gear GRI are meshed with each other, and the transmission shaft gear GRI and the first motor gear GMF are meshed with each other.

The transmission shaft gear GRI is mechanically connected to a sun gear GRS of the planet gear mechanism PLN through a transmission shaft SFD. The sun gear GRS is meshed with a planet gear GRP, and the planet gear GRP is meshed with an annular gear (ring gear) GRU. On the outer periphery of the annular gear GRU, a gear is formed and meshed with a second motor gear GMS. The plurality of planet gears GRP are held by a planet carrier PLC. An output carrier gear GRO is fixed to the planet carrier PLC. More specifically, the sun gear GRS or the like configures the planet gear mechanism PLN.

In contrast to the input rod RDI, a rotational output from the planet gear mechanism PLN is converted into linear motion of the output rod RDO through an output conversion mechanism HNK. Like the input conversion mechanism HNJ, the output conversion mechanism HNK is a power conversion mechanism between rotational motion and linear motion. More specifically, an output male screw ONK is formed on the output rod RDO, the output male screw ONK is meshed with an output female screw MNK. On the outer periphery of the output female screw MNK, an output rod gear GRK is fixed, and the output rod gear GRK and the output carrier gear GRO are meshed with each other.

The central axis line Jin of the input rod RDI, a rotation axis line Jpl of the planet gear mechanism PLN, and the central axis line Jot of the output rod RDO are parallel with each other, and are different axes the inter-axis distances of which are not zero. The output rods RDI and RDO are fixed to the case member CAS such that the input and output rods RDI and RDO can be smoothly slid in a direction along the central axis line Jin with respect to the case member CAS. More specifically, in the differential mechanism DFR, the input rod RDI and the output rod RDO are attached such that the input rod RDI and the output rod RDO can relatively move.

As in the first configuration, the forward rotational motion of the first and second electric motors MTF and MTS correspond to motion of the output rod RDO in the forward direction (direction in which a wheel cylinder fluid pressure increases). On the other hand, the reverse rotational motion of the first and second electric motors MTF and MTS correspond to motion of the output rod RDO in the backward direction (direction in which the wheel cylinder fluid pressure decreases).

When rotational outputs (rotating directions and output torques) from the first and second electric motors MTF and MTS are adjusted, also in the second configuration, as in the first configuration, the input rod RDI and the output rod RDO are controlled independently of each other in terms of a "relationship between force and displacement". For example, when regenerative braking is performed, a "state in which the operation force Fbp of the braking operation member BP is increased with respect to an increase of the operation displacement Sbp of the braking operation member BP" and a "state in which the displacement Sps of the output rod RDO is zero (i.e., a state in which frictional braking force is not generated)" can be achieved. As a result, the same advantages as those in the first configuration (simplification and reduction in size of the device, securement of an appropriate smooth operation characteristic, and improvement of energy regeneration efficiency) can be exerted.

The second configuration of the differential device DFR describes a configuration in which an "output from the input rod RDI (i.e., the input rod gear GRJ) and an output from the first electric motor MTF (i.e., the first motor gear GMF)" are input to the sun gear GRS, an "output from the second electric motor MTS (i.e., the second motor gear GMS)" is input to the annular gear GRU, and outputting from a planet carrier PLC to the output rod RDO is performed. As a configuration candidate of the planet gear mechanism PLN, a configuration in which an "output from the input rod RDI and an output from the first electric motor MTF" are input to "at least one member of the sun gear GRS, the planet carrier PLC, and the annular gear GRU", an "output from the second electric motor MTS" is input to "at least one member of the remaining two members", and outputting from the "other member of the remaining two members" to the output rod RDO is performed can be employed.

Another Embodiment

Another embodiment (modification) will be described below. Also in the embodiment, the brake actuator BAC exerts the same advantages as described above (simplification and reduction in size of the device, securement of an appropriate smooth operation characteristic, and improvement of energy regeneration efficiency).

As a device giving a braking torque to the rotating members KT (i.e., the wheels WH), a disc braking device is illustrated. In place of this, a drum braking device (drum brake) can be employed. In the drum brake, in place of the calipers CP, a brake drum is employed. A frictional member is a brake shoe, and the rotating member KT is a brake drum.

As fluid pressure circuits (configuration of brake pipes) of two systems, a diagonal type (also called an X-type) is illustrated. In place of this, a front-to-back type (also called an H-type) configuration can also be employed. In this case, the first fluid path HKA is fluidically connected to the front wheel cylinders WCfr and WCfl, and the second fluid path HKB is fluidically connected to the rear wheel cylinders WCrr and WCrl.

An example in which a 3-phase brushless motor is employed as the electric motors MT has been described. As the electric motor, in place of the brushless motor, a motor with brush (also called a brush motor) can be employed. In this case, as the bridge circuit, an H bridge circuit formed of four switching elements (power transistors) is used. More specifically, in the bridge circuit of the brush motor, one of the three phases of the brushless motor is omitted. As in the brushless motor, the first and second rotating angle sensors MKF and MKS are disposed for the first and second electric motors MTF and MTS, and the stabilizing circuit LPF is disposed for the first and second drive circuits DRF and DRS. Furthermore, the energization quantity sensor IMA is disposed for the drive circuits DRF and DRS.

An example in which a drive electric motor is employed as the electric generator MTD has been described. However, as the electric generator MTD, an electric generator which does not function for driving and has only an electric generation function can be employed. Also in this case, the electric generator MTD is mechanically connected to the wheels WH, and kinetic energy of the vehicle is regenerated as electric power when the vehicle is decelerated. At this time, regenerative braking force is given to the wheels WH.

What is claimed is:

1. A braking control device for vehicle which moves a brake fluid from a master cylinder to a wheel cylinder depending on an operation of a braking operation member for vehicle to generate braking force on a wheel comprising:
    a case member fixed to the master cylinder;
    a first electric motor fixed to the case member;
    a second electric motor fixed to the case member independently of the first electric motor;
    an input rod mechanically connected to the braking operation member and linearly moving;
    an output rod which presses pistons in the master cylinder and can linearly move in parallel with a central axis line of the input rod;
    a differential mechanism which receives an output from the first electric motor and an output from the second electric motor, allows relative movement between the input rod and the output rod, and is built in the case member; and
    a controller which controls the output from the first electric motor and the output from the second electric motor to independently control force acting on the input rod and displacement of the output rod.

2. The braking control device for vehicle according to claim 1, wherein
    an electric generator generating regenerative braking force on the wheel is disposed, and
    when the electric generator generates the regenerative braking force,
    the controller increases the force acting on the input rod with an increase in displacement of the input rod and controls an output from the first electric motor and an output from the second electric motor to keep the displacement of the output rod at zero.

3. A braking control device for vehicle which moves a brake fluid from a master cylinder to a wheel cylinder depending on an operation of a braking operation member for vehicle to generate braking force on a wheel comprising:
    a first electric motor having a first pinion gear on an output shaft;
    a second electric motor being different from the first electric motor and having a second pinion gear on an output shaft;
    an input rod mechanically connected to the braking operation member;
    a first rack fixed to the input rod and having a first input rack gear meshed with the first pinion gear;
    an output pinion gear meshed with a first output rack gear different from the first input rack gear on the first rack;
    an output rod to which the output pinion gear is rotatably fixed, moving in a direction parallel with a central axis line of the input rod, and pressing pistons in the master cylinder; and
    a second rack on which a second input rack gear unit meshed with the second pinion gear and a second output rack gear unit meshed with the output pinion gear are formed and which can move in a direction parallel with the central axis line of the input rod.

4. The braking control device for vehicle according to claim 1, wherein the differential mechanism comprises a planet gear mechanism, and the input rod is connected to the output rod through the planet gear mechanism.

* * * * *